United States Patent [19]

Paré et al.

[11] Patent Number: 5,005,255
[45] Date of Patent: Apr. 9, 1991

[54] HANDLE SYSTEM

[75] Inventors: Rodney H. Paré, West Warwick; Peter D. Tata; Anthony R. Marrocco, both of Johnston, all of R.I.

[73] Assignee: Square Head, Inc., Exeter, N.H.

[21] Appl. No.: 536,167

[22] Filed: Jun. 11, 1990

[51] Int. Cl.⁵ .............................................. E05B 7/00
[52] U.S. Cl. ........................................ 16/115; 16/126; 16/112
[58] Field of Search .......................... 16/115, 112, 126

[56] References Cited

U.S. PATENT DOCUMENTS

| 888,079 | 8/1908 | Furman | 16/115 |
|---|---|---|---|
| 1,261,859 | 4/1918 | Seiter | 294/53.5 |
| 2,091,495 | 8/1937 | Steen | 16/112 |
| 2,269,851 | 6/1942 | Huffman | 16/126 |
| 3,572,870 | 3/1971 | Marks | 16/115 |

Primary Examiner—Richard K. Seidel
Assistant Examiner—Chuck Y. Mah
Attorney, Agent, or Firm—Barlow & Barlow, Ltd.

[57] ABSTRACT

System, including a U-shaped handle, that is swingable about an axis passing through the ends of its legs and selectably lockable in an operative position or an inoperative storage position.

9 Claims, 2 Drawing Sheets

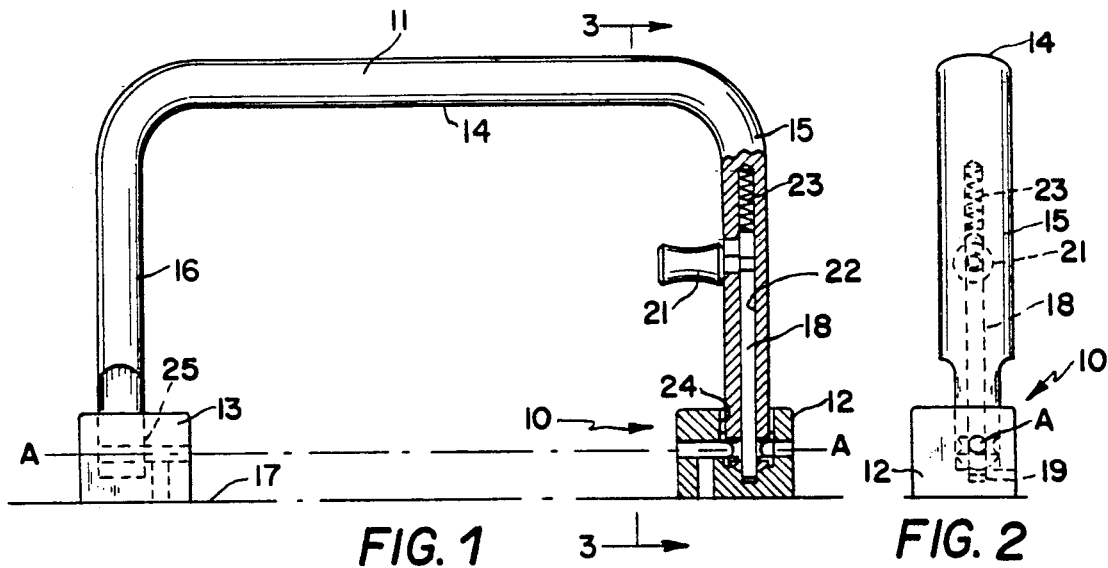
FIG. 1   FIG. 2
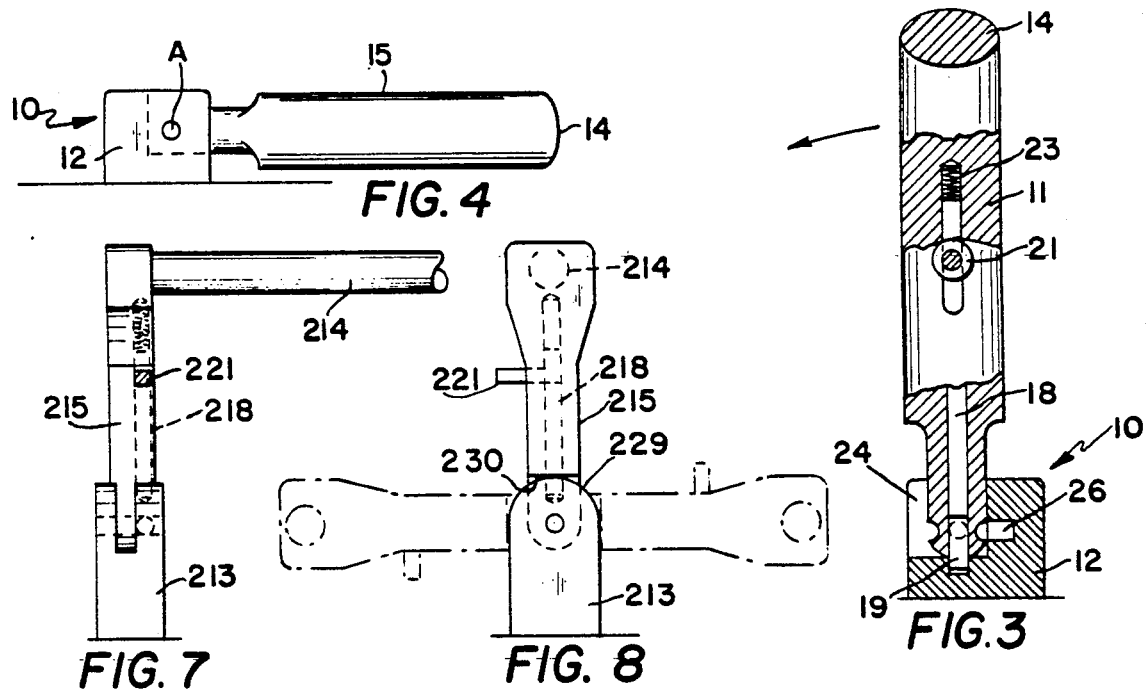
FIG. 4
FIG. 7   FIG. 8   FIG. 3
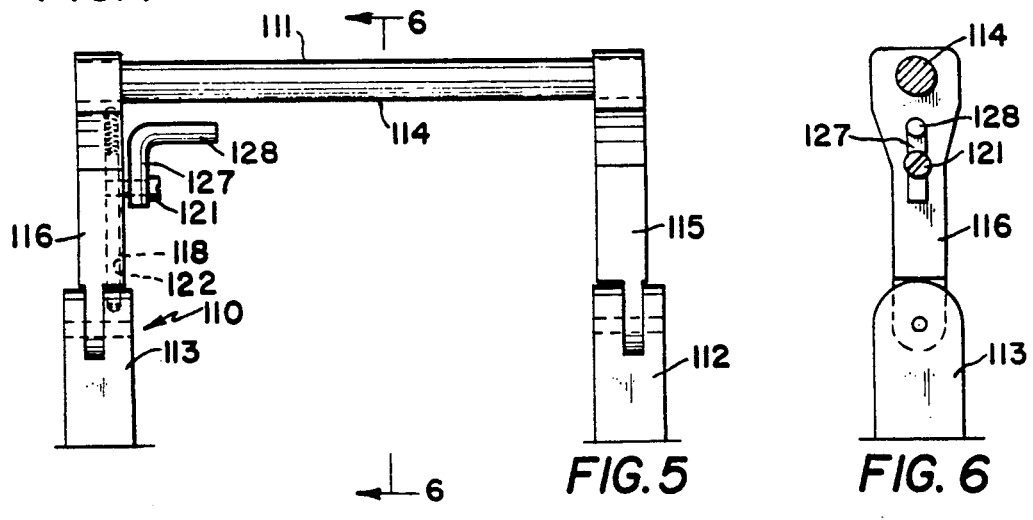
FIG. 5   FIG. 6

HANDLE SYSTEM

BACKGROUND OF THE INVENTION

There are many situations in scientific and transportation activities where it is desirable to provide a U-shaped handle that can be moved from a fixed inoperative storage position to a fixed operative position, This is because, under certain circumstances, a rigid operative position of the handle is undesirable, because it protrudes, occupies space, and catches on clothes, etc. For instance, the limited space in space vehicles, aircraft, and yachts prohibits such protrusion, except when the handle is actually being used. Similarly, when the handle is hanging downwardly in the inoperative position, loose swinging can be a problem, because of the noise of the handle striking the mounting surface and, perhaps, scratching it. In a space vehicle, the movement can be disconcerting and can even effect sensitive instruments.

Of course, U-shaped handles have for many years been mounted to swing about an axis that passes through the ends of the legs; such a handle system is shown, for instance, in the U.S. patent of AXTELL No. 2,673,630 and the German patent SCHNITTERT No. 2,036,064.

Similarly, many constructions have been developed to lock straight handles in selected angular positions relative to tools, etc., as shown in the U.S. patent of SEITER No. 1,261,859; the U.S. patent of KORTUM No. 2,966,365; and the U.S. patent of GUERTZEN No. 4,392,536. U-shaped handles have also been provided with detent mechanisms to lock them in selected angular positions, as shown and described in various patents, including the U.S. patent of HUFFMAN No. 2,269,851 (handle on sad iron); the U.S. patent of BROCK No. 4,261,077 (window sash lift); the U.S. patent of Mc-KNIGHT No. 4,023,702 (paint tray handle); the U.S. patent of TETI No. 4,196,821 (instrument housing handle); the U.K. patent of DUNCOMBE No. 331,378 (kettle handle); the German patent of ALEXANDRE No. 25,049; and the U.K. patent of SOHNE NO. 1,031,440 (instrument case handle).

These constructions have all had deficiencies that make them less than desirable when applied to the vertical surfaces of drawers and the like, particularly when used in vehicles which have narrow corridors and similar spaces having drawers and doors. The prior art detent equipment is fragile, complex, and expensive. Most of them art aesthetically awkward appearing, as well as presenting sharp edges. These and other deficiencies experienced with the prior art devices have been obviated in a novel manner by the present invention.

It is, therefore, an outstanding object of the invention to provide a handle construction which extends outwardly only when being used.

Another object of this invention is the provision of a handle system for use on the vertical surfaces of drawers and doors which has means for holding the handle selectively in a horizontal or a vertical position.

A further object of the present invention is the provision of a handle system which is simple in construction, which is inexpensive to manufacture, and which is capable of a long life of useful service with a minimum of maintenance.

It is another object of the instant invention to provide a handle system having fixed positions, including an operative and an inoperative storage position.

A still further object of the invention is the provision of a handle for use with a vertical surface, which handle, on occasion, hangs downwardly and ,in that position, cannot swing.

It is a further object of the invention to provide a handle system having a U-shaped handle with a position-locking detent whose operating lever is conveniently located.

With these and other objects in view, as will be apparent to those skilled in the art, the invention resides in the combination of parts set forth in the specification and covered by the claims appended hereto.

SUMMARY OF INVENTION

In general, the invention consists of a handle system having a handle of generally U-shaped configuration having an elongated main body and a leg extending at a right angle thereto at each end, and having two base elements adapted to be mounted in spaced relationship on a vertical surface and hingedly connected to free ends of the said legs, so that the handle can swing from an operative position to a storage position about a horizontal axis passing through both base elements and parallel to the said surface. A plunger is provided that is slidably mounted on at least one leg and adapted to slide from a forward position in a recess in a base element to a rearward position removed from the recess. An actuator is provided for moving the plunger from the forward position to the rearward position.

More specifically, the handle system is arranged, so that the plunger is carried in a bore extending lengthwise of the leg and is biased toward the forward position by a coil spring lying in the bore, and each base element is formed with a stop means to limit the swing of the handle to the operative position and the storage position.

BRIEF DESCRIPTION OF THE DRAWINGS

The character of the invention, however, may be best understood by reference to several of its structural forms, as illustrated by the accompanying drawings, in which:

FIG. 1 is a plan view of a handle system embodying the principles of the present invention FIG. 2 is a right hand elevational view of the invention, FIG. 3 is a sectional view of the invention, taken on the line III—III of FIG.1, FIG. 4 is a left hand elevational view of the invention, showing the handle in stored position, FIG. 5 is a plan view of a modified form of the invention, FIG. 6 is a sectional view of the modification of FIG. 5, taken on the line VI—VI o FIG. 5, FIG. 7 is a partial elevational view of another modification of the invention, FIG. 8 is an end view of a portion of the modification of the invention shown in FIG. 7.

DESCRIPTION OF THE PREFERRED EMBODIMENT

Figure 9:
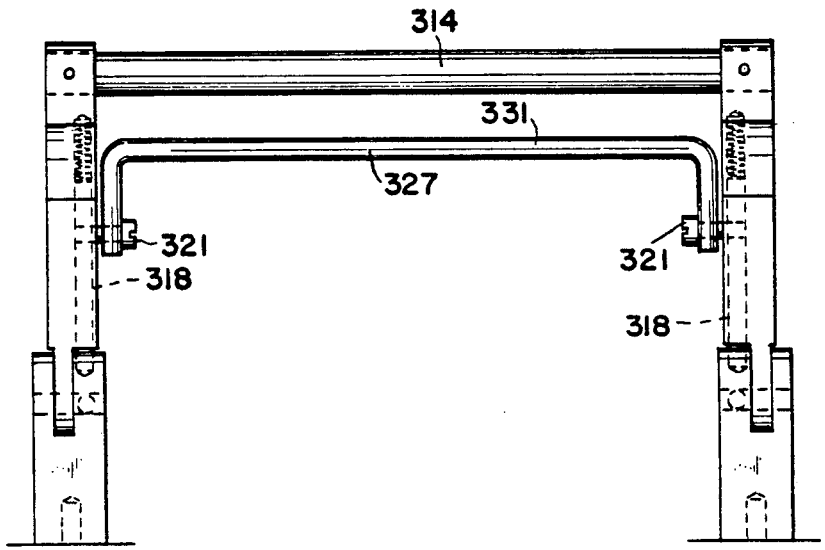
FIG. 9 is a plan view of another form of the invention.

Referring first to FIG. 1, which best shows the general features of the invention the handle system, indicated generally by the reference numeral 10, is shown as having a handle 11 and two base elements 12 and 13.

The handle 11 has a generally U-shaped configuration with an elongated main body 14 and two legs 15 and 16 extending at right angles to the ends of the main body. The base elements 12 and 13 are mounted on a vertical surface 17, such as the front surface of a drawer. The base elements 12 and 13 are hingedly connected to the free ends of the legs 15 and 16, respectively, of the handle. In this way, the handle 11 can swing about an axis A—A from a horizontal operative position, as shown, to a vertical storage position, at which last-named position it hangs downwardly in a generally parallel manner to the surface 17.

FIGS. 1-4 illustrate th details of the handle system 10. A plunger 18 is slidably mounted on the leg 15 and is adapted to slide from a forward position, at which position its end resides in a recess 19 in the base element 12, to a rearward position removed from the recess.

An actuator 21 extends inwardly of the handle 11 in the general plane of the handle; the actuator is fixed to the plunger 18 and extends at a right angle thereto. The plunger is carried in a bore 22 which extends longitudinally of the leg 15 and is biased toward the forward position by a coil spring 23.

The handle 11 is reduced at the ends of its legs 15 and 16 and each of these ends resides in a slot 24 or 25 formed in the base element 12 or 13 respectively. These slots terminate in interior walls that limit the swing of the handle to 90 degrees, so that at one end of the swing the handle is in the operative position, while at the other end of the swing the wall of the recess locates the handle in its storage position. In that last position, the handle is generally spaced from and parallel to the surface 17. The ends of the legs are rounded (see FIG. 4) concentrically of the axis A—A to permit swinging in the recess 24. The pivoting about the axis A—A is brought about by the use of pivot pins in the base elements whose ends engage a cross hole adjacent the end of the leg.

The operation and advantages of the invention will now be readily understood in view of the above description. Let it be supposed, for the purpose of illustration, that the vertical surface 17 is the outer surface of a drawer used in a confined space in an aircraft. Under such circumstances, it is desirable that the handle protrude into the space during as little a period of time as possible. In other words, the handle should be in the operative position only when being used to pull the drawer out; otherwise, it should be in the storage position.

In order to move the handle from one position to the other, it is only necessary to grasp the main body of the handle 11 and to extend a finger to pull the actuator 21 toward the main body. The movement of the actuator 21 draws the plunger 18 away from the surface 17; the free end of the plunger is then withdrawn from the locking recess 19 (if the handle is in the operative position) and the handle is then free to be swung downwardly to the storage position where the end of the plunger engages a locking recess 26. At either end of the swing, the leg of the handle strikes a stop means in the form of one of the 90 degree walls of the slot 24.

It can be seen, then, that the major advantage of the present invention is that the handle is securely locked at either end of the swing, i.e., at the operative position or at the storage position. The handle can be easily and conveniently unlocked at either position by pressing the actuator 21. There are no protruding mechanisms to catch on clothing and to cause other problems. In the storage position, the handle does not swing, as would normally be the case because of engine vibrations, etc., so that it does not strike the surface 17 and make a disconcerting noise, nor does it mar that surface. It also makes use of a rugged structure that is not easily damaged by abuse or neglect.

FIGS. 5 and 6 show a modified form of the invention, wherein the actuator 121 has an L-shaped extension 127 with a leg 128 that lies close to the main body 114. The handle system 110 includes a handle 111 of generally U-shaped configuration having an elongated main body 114 and legs 115, 116 extending at right angles thereto at the ends. Two base elements 112, 113 are provided which are adapted to be mounted in spaced relationship on a vertical surface and hingedly connected to free ends of the said legs, so that the handle can swing from an operative position to a storage position about a horizontal axis passing through both base elements and parallel to the said surface.

The storage position may be upward or downward, as is evident in the drawing. A plunger 118 is slidably mounted on at least one leg and adapted to slide from a forward position in a locking recess in a base element to a rearward position removed from the recess. The actuator 127 and its extension are provided for moving the plunger from the forward position to the rearward position.

The plunger is carried in a bore 122 extending lengthwise of the leg and is biased toward the forward position by a coil spring lying in the bore. Each base element is formed with a stop means to limit the swing of the handle to either of the positions. In this construction, the plunger is located a short distance away from the hinging mechanism, as is evident in FIG. 7.

FIGS. 7 and 8 show another modification of the invention in which an actuator 221 extends upwardly of the handle, when it is in the horizontal position. This version of the handle system 210 includes a handle 211 of generally U-shaped configuration having an elongated main body 214 and legs extending at a right angle thereto to the ends. Two base elements, such as the element 213, are adapted to be mounted in spaced relationship on a vertical surface and are hingedly connected to free ends of the said legs, so that the handle can swing from an operative position to a storage position about a horizontal axis passing through both base elements and parallel to the said vertical surface. The storage position may be either upward or downward, as is evident from the drawing.

A plunger 218 is slidably carried in at least one leg and is adapted to slide from a forward position in a recess in a base element to a rearward position removed from the recess. The actuator 221 is provided for moving the plunger from the forward position to the rearward position. The plunger is carried in a bore extending lengthwise of the leg and is biased toward the forward position by a coil spring lying in the bore. Each base element is formed with a stop means to limit the swing of the handle to the operative position and the storage position. It should be noted that the base element 213 is provided with a semi-cylindrical surface 229 along which a straight surface of the leg slides.

Figure 10:
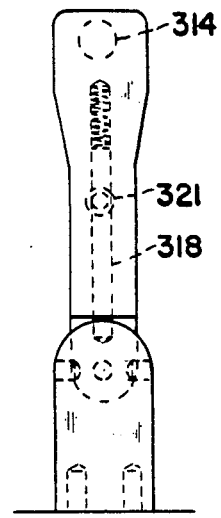
FIG. 10 is a right-hand elevational view of the form of the invention shown in FIG. 9.

FIGS. 9 and 10 illustrate a still further modification of the invention, in which a U-shaped extension 327 joins two actuators 321. The extension has a main body 331 consisting of a rod that lies closely-spaced from and parallel to a main body 314 of the handle 311. The handle system 310 includes the handle 314 which is of a generally U-shaped configuration having the elongated main body 314 and a leg extending at a right angle to each end. Two base elements 312 and 313 are adapted to be mounted in spaced relationship on a vertical surface and are hingedly connected to free ends of the said legs, so that the handle can swing from an operative position to one of two storage positions, The swing takes place about a horizontal axis passing through both base elements and parallel to the said surface. The storage positions can be either upward or downward.

A plunger 318 is slidably mounted in each leg and is adapted to slide from a forward position in a recess in its respective base element to a rearward position removed from the recess. The actuators 321 act to move the plungers from the forward position to the rearward position. Each plunger is carried in a bore extending lengthwise of the leg and is biased toward the forward position by a coil spring lying in the bore. Each base element is provided with a semi-cylindrical surface engaged by a straight surface extending across the leg adjacent to its end. Each base element is formed with a straight surface that acts to limit the swing of the handle to the storage position. The release of the plungers from their recesses in the base elements takes place by simply squeezing the main body 331 of the extension 327 toward the main body 314 of the handle.

Figure 11:
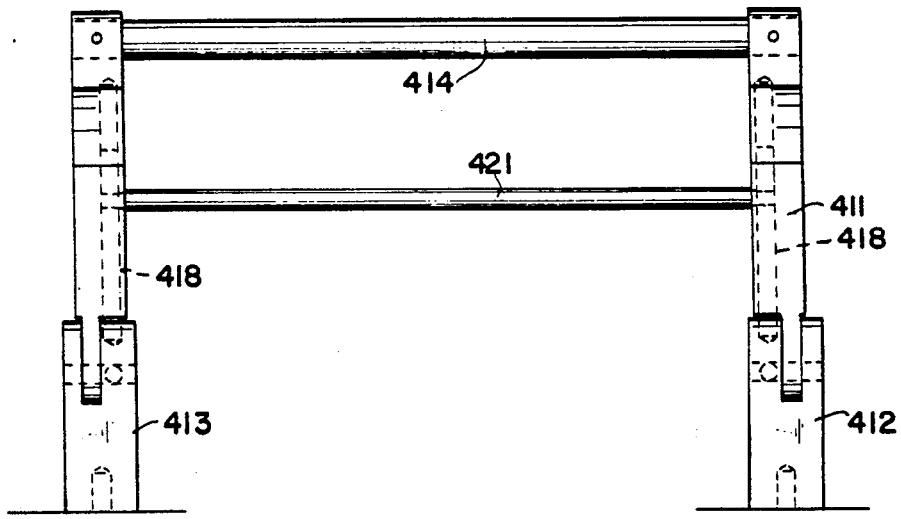
FIG. 11 is a plan view of a still further modified form of the invention, shown with the handle in operative position.
Figure 12:
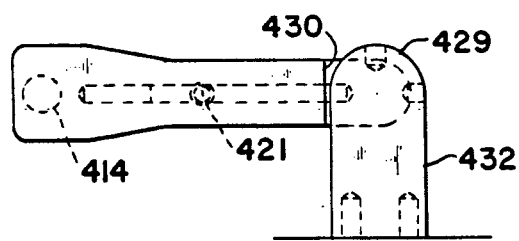
FIG. 12 is a right-hand elevational view of the invention of FIG. 11, shown with the handle in storage position.

Finally, the modification illustrated in FIGS. 11 and 12 consists of handle system 410 in which the actuator 421 is a single bar that extends across the handle 411 at a location which is spaced from and parallel to a main body 414 of the handle. The handle 411 is of a generally U-shaped configuration having the elongated main body 414 and a leg extending at a right angle at each end. The two base elements 412 and 413 are adapted to be mounted in spaced relationship on a vertical surface and ar hingedly connected to free ends of the said legs. The handle can, therefore, be swung from a horizontal operative position to one of two storage positions (upward or downward) about a horizontal axis passing through both base elements and parallel to the said surface.

A plunger 418 is slidably mounted in each leg and is adapted to slide from a forward position in a recess in its respective base element to a rearward position removed from the recess. The actuator 421 acts to move the plungers from their forward positions to their rearward positions. Each base element 412 and 413 is formed with a semi-cylindrical surface 429 which is provided with recesses to receive the plunger at the operative position and the storage positions. Each leg is provided with a transverse straight surface 430 which slides along the surface 429 during swinging. Stop means is provided in the form of straight surfaces 432 to act on the surface 430 to limit the swing of the handle to the operative position and the storage positions.

It is obvious that minor changes may be made in the form and construction of the invention without departing from the material spirit thereof. It is not, however, desired to confine the invention to the exact form herein shown and described, but it is desired to include all such as properly come within the scope claimed:

The invention having been thus described, what is claimed as new and desired to secure by Letters Patent is:

1. Handle system, comprising
   (a) a handle of generally U-shaped configuration having an elongated main body and a leg extending at a right angle thereto at each end,
   (b) two base elements adapted to be mounted in spaced relationship on a vertical surface and hingedly connected to free ends of the said legs, so that the handle can swing from an operative position to a storage position about a horizontal axis passing through both base elements and parallel to said surface,
   (c) a plunger slidably mounted within at least one leg and adapted to slide from a forward position in a recess in a base element 15 to a rearward position removed from the recess, and
   (d) an actuator for moving the plunger from the forward position to the rearward position.

2. Handle system, as recited in claim 1, wherein the plunger is carried in a bore extending lengthwise of the leg and is biased toward the forward position by a coil spring lying in the bore.

3. Handle system as recited in claim 1, wherein each base element is formed with a separate stop means to limit the swing of the handle to the operative position and the storage position.

4. Handle system as recited in claim 1, wherein the actuator extends at a right angle to the plunger in the general plane of the handle and inwardly of the U-shaped configuration.

5. Handle system as recited in claim 4, wherein the actuator is generally spool-shaped, with a reduced center and enlarged ends.

6. Handle system as recited in claim 1, wherein the actuator extends at a right angle to the plunger from one leg of the handle toward the other and has attached to its outer end an L-shaped extension, one branch of which extends from the actuator along the leg and the other branch of which extends parallel to the main body of the handle adjacent thereto.

7. Handle system as recited in claim 1, wherein the actuator extends at a right angle to the plunger and upwardly at a right angle to the general plane of the handle when the handle is in the operative position.

8. Handle system as recited in claim 1, wherein a plunger resides in each leg of the handle, wherein an actuator extends at a right angle to each plunger in the general plane of the handle, and wherein a U-shaped extension connects the inner ends of the actuators, the extension including a pressure bar in close-spaced, parallel relationship to the main body of the handle.

9. Handle system as recited in claim 1, wherein a plunger resides in each leg of the handle, wherein a pressure bar extends between the plungers at a right angle thereto, the pressure bar extending in spaced, parallel relationship to the main body of the handle.

* * * * *